(12) United States Patent
Fairbourn et al.

(10) Patent No.: US 9,133,718 B2
(45) Date of Patent: Sep. 15, 2015

(54) TURBINE ENGINE COMPONENTS WITH NON-ALUMINIDE SILICON-CONTAINING AND CHROMIUM-CONTAINING PROTECTIVE COATINGS AND METHODS OF FORMING SUCH NON-ALUMINIDE PROTECTIVE COATINGS

(75) Inventors: David C. Fairbourn, Sandy, UT (US); Paul Walker, Dunholme (GB)

(73) Assignees: MT COATINGS, LLC, Cincinnati, OH (US); SIEMENS AKTIENGESELLSCHAFT, Munich (DE)

( * ) Notice: Subject to any disclaimer, the term of this patent is extended or adjusted under 35 U.S.C. 154(b) by 1647 days.

(21) Appl. No.: 11/721,532

(22) PCT Filed: Dec. 12, 2005

(86) PCT No.: PCT/US2005/044843
§ 371 (c)(1),
(2), (4) Date: Oct. 3, 2007

(87) PCT Pub. No.: WO2007/067185
PCT Pub. Date: Jun. 14, 2007

(65) Prior Publication Data
US 2008/0096045 A1   Apr. 24, 2008

Related U.S. Application Data

(63) Continuation-in-part of application No. PCT/US2004/041896, filed on Dec. 13, 2004.

(51) Int. Cl.
*C23C 18/04* (2006.01)
*F01D 5/28* (2006.01)
(Continued)

(52) U.S. Cl.
CPC .............. *F01D 5/288* (2013.01); *C23C 18/04* (2013.01); *C23C 18/06* (2013.01);
(Continued)

(58) Field of Classification Search
USPC ........................................... 427/380
See application file for complete search history.

(56) References Cited

U.S. PATENT DOCUMENTS 2,809,139 A * 10/1957 Bloom et al. ............... 148/668
3,047,419 A    7/1962 Yntema
(Continued)

FOREIGN PATENT DOCUMENTS

DE    4103994 A1    8/1992
EP    0048083 A1    3/1982
(Continued)

OTHER PUBLICATIONS

Daimer et al "New Results on the Oxidation and Hot Corrosion of Silicide Overlay Coatings on Nickel-Based Alloys" Thin Solid Films 84 (1981) pp. 119-125.*
(Continued)

*Primary Examiner* — Nathan Empie
(74) *Attorney, Agent, or Firm* — Thompson Hine LLP

(57) ABSTRACT

A turbine engine component (10) with a non-aluminide protective coating (14) containing silicon and chromium and a process for forming such non-aluminide protective coatings (14). The non-aluminide protective coating (14) is formed by applying a silicon-containing fluid composition to the turbine engine component (10) as a silicon-containing layer (20) and heating the silicon-containing layer (20) to a temperature effective to form the non-aluminide protective coating (14).

3 Claims, 2 Drawing Sheets

(51) Int. Cl.
  *C23C 18/06* (2006.01)
  *C23C 18/12* (2006.01)
  *C23C 26/00* (2006.01)
  *C23C 30/00* (2006.01)

(52) U.S. Cl.
  CPC ........ *C23C 18/1212* (2013.01); *C23C 18/1241* (2013.01); *C23C 18/1275* (2013.01); *C23C 18/1279* (2013.01); *C23C 18/1295* (2013.01); *C23C 26/00* (2013.01); *C23C 30/00* (2013.01); *Y02T 50/671* (2013.01); *Y10T 428/12674* (2015.01)

(56) References Cited

U.S. PATENT DOCUMENTS

| | | |
|---|---|---|
| 3,615,885 A | 10/1971 | Watson et al. |
| 3,830,652 A | 8/1974 | Gazza |
| 3,849,865 A | 11/1974 | Gedwill et al. |
| 3,951,642 A * | 4/1976 | Chang et al. .......... 75/255 |
| 4,189,545 A * | 2/1980 | Modic .......... 521/131 |
| 4,321,311 A | 3/1982 | Strangman |
| 4,369,233 A * | 1/1983 | van Schaik .......... 428/678 |
| 4,427,720 A | 1/1984 | Gauje |
| 4,500,364 A | 2/1985 | Krutenat |
| 4,774,149 A * | 9/1988 | Fishman .......... 428/680 |
| 4,835,011 A | 5/1989 | Olson et al. |
| 4,880,614 A | 11/1989 | Strangman et al. |
| 4,916,022 A | 4/1990 | Solfest et al. |
| 5,015,502 A | 5/1991 | Strangman et al. |
| 5,512,382 A | 4/1996 | Strangman |
| 5,514,482 A | 5/1996 | Strangman |
| 5,562,998 A | 10/1996 | Strangman |
| 5,624,721 A | 4/1997 | Strangman |
| 5,677,060 A | 10/1997 | Terentieva et al. |
| 5,721,061 A | 2/1998 | Jackson et al. |
| 5,780,110 A | 7/1998 | Schaeffer et al. |
| 5,817,372 A * | 10/1998 | Zheng .......... 427/456 |
| 5,837,385 A | 11/1998 | Schaeffer et al. |
| 5,900,278 A * | 5/1999 | Coffinberry et al. .......... 427/227 |
| 5,900,283 A | 5/1999 | Vakil et al. |
| 6,103,386 A | 8/2000 | Raybould et al. |
| 6,224,963 B1 | 5/2001 | Strangman |
| 6,287,644 B1 | 9/2001 | Jackson et al. |
| 6,372,666 B1 * | 4/2002 | Ramos et al. .......... 438/781 |
| 6,395,343 B1 | 5/2002 | Strangman |
| 6,458,473 B1 | 10/2002 | Conner et al. |
| 6,482,537 B1 | 11/2002 | Strangman et al. |
| 6,579,627 B1 | 6/2003 | Darolia et al. |
| 6,605,161 B2 | 8/2003 | Fairbourn |
| 6,635,124 B1 | 10/2003 | Stowell et al. |
| 6,673,709 B2 | 1/2004 | Jaslier et al. |
| 6,689,422 B1 | 2/2004 | Warnes et al. |
| 6,797,408 B2 | 9/2004 | Walston et al. |
| 6,849,132 B2 | 2/2005 | Warnes et al. |
| 6,884,470 B2 | 4/2005 | Gorman |
| 6,924,038 B1 | 8/2005 | Hardy et al. |
| 2001/0032568 A1* | 10/2001 | Schutt .......... 106/287.11 |
| 2002/0023696 A1 | 2/2002 | Jaslier et al. |
| 2002/0179191 A1* | 12/2002 | Fairbourn .......... 148/273 |
| 2003/0185990 A1 | 10/2003 | Bittner et al. |
| 2004/0038069 A1 | 2/2004 | Warnes et al. |
| 2004/0067317 A1 | 4/2004 | Gorman |
| 2005/0000425 A1 | 1/2005 | Fairbourn |
| 2005/0170200 A1 | 8/2005 | Nagaraj et al. |
| 2006/0057418 A1 | 3/2006 | Fairbourn |
| 2008/0274290 A1* | 11/2008 | Fairbourn .......... 427/383.7 |

FOREIGN PATENT DOCUMENTS

| | | |
|---|---|---|
| EP | 0327311 A2 | 8/1989 |
| EP | 0532255 A1 | 3/1993 |
| EP | 0821078 A1 | 1/1998 |
| EP | 0897996 A1 | 2/1999 |
| EP | 0992612 A2 | 4/2000 |
| EP | 0992613 A2 | 4/2000 |
| EP | 1008672 A1 | 6/2000 |
| EP | 1010774 A1 | 6/2000 |
| EP | 1079073 A2 | 2/2001 |
| EP | 1111192 A1 | 6/2001 |
| EP | 1199377 A2 | 4/2002 |
| EP | 1229146 A2 | 8/2002 |
| EP | 1338668 A1 | 8/2003 |
| GB | 1439947 A | 6/1976 |
| GB | 1479498 A | 7/1977 |
| GB | 1529441 A | 10/1978 |
| GB | 2202235 A | 9/1988 |
| GB | 2252567 A | 8/1992 |
| GB | 2285632 A | 7/1995 |
| JP | 60100657 A | 4/1985 |
| WO | 9830735 A2 | 7/1998 |
| WO | 9924647 A1 | 5/1999 |
| WO | 0190438 A1 | 11/2001 |
| WO | 0190441 A2 | 11/2001 |
| WO | 02099153 A2 | 12/2002 |
| WO | 03035942 A2 | 5/2003 |
| WO | 2006036171 A | 4/2006 |

OTHER PUBLICATIONS

European Patent Office, International Search Report issued in corresponding PCT Application serial No. PCT/US2004/041896 dated May 27, 2005.

European Patent Office, International Search Report issued in corresponding PCT Application serial No. PCT/US2005/045078 dated Oct. 10, 2006.

European Patent Office, International Search Report issued in corresponding PCT Application serial No. PCT/US2005/012527 dated Nov. 24, 2006.

European Patent Office, International Search Report issued in corresponding PCT Application serial No. PCT/US2005/044843 dated Jun. 14, 2007.

Savage, Jason L., U.S. Patent and Trademark Office, Office Action Dated Jan. 25, 2007 in related U.S. Appl. No. 10/943,116.

Savage, Jason L., U.S. Patent and Trademark Office, Office Action Dated Jun. 29, 2007 in related U.S. Appl. No. 10/943,116.

USPTO, Office Action issued in related U.S. Appl. No. 11/575,105 dated Nov. 2, 2009.

European Patent Office Official Letter in corresponding EP05858676.9, dated Jul. 24, 2009, 4 pgs.

European Patent Office Official Letter in corresponding EP05851165, dated Jul. 24, 2009, 4 pgs.

USPTO, Office Action issued in related U.S. Appl. No. 11/721,564 dated Jul. 22, 2010.

USPTO, final Office Action issued in related U.S. Appl. No. 11/721,564 dated Feb. 22, 2011.

USPTO, Notice of Allowance issued in U.S. Appl. No. 11/721,564 dated Sep. 6, 2013.

* cited by examiner

TURBINE ENGINE COMPONENTS WITH NON-ALUMINIDE SILICON-CONTAINING AND CHROMIUM-CONTAINING PROTECTIVE COATINGS AND METHODS OF FORMING SUCH NON-ALUMINIDE PROTECTIVE COATINGS

CROSS-REFERENCE TO RELATED APPLICATIONS

This application is a continuation-in-part of PCT/US2004/041896, filed on Dec. 13, 2004, the disclosure of which is hereby fully incorporated by reference herein in its entirety.

FIELD OF THE INVENTION

The present invention relates to coated metal components and, more particularly, turbine engine components with a non-aluminide protective coating containing silicon and chromium and methods of forming such protective coatings on turbine engine components.

BACKGROUND OF THE INVENTION

Intermetallic layers and coatings are often formed on a surface of a metal component to protect the underlying metal substrate of the component and to extend its useful life during operation. For example, many superalloy components in gas turbine engines, like turbine blades, vanes, shrouds, and nozzle guides, include an aluminide coating on airflow or gas washed surfaces that protect the underlying superalloy base metal from high temperature oxidation and corrosion. Among other applications, gas turbine engines are used as aircraft or jet engines (e.g., turbofans), as industrial gas turbine engines for power generation, as part of mechanical drive units for items such as pumps and compressors, and as power plants providing motive forces to propel vehicles.

Generally, gas turbine engines include a compressor for compressing air, a combustor for mixing the compressed air with fuel, such as, but not limited to, jet fuel, natural gas, diesel, biomass waste gases, naptha and gasified coal gases, the mixture is subsequently ignited. The engine also includes a turbine blade assembly for producing power. In particular, gas turbine engines operate by drawing air into the front of the engine. The air is then compressed, mixed with fuel, and combusted. Hot exhaust gases from the combusted mixture pass through a turbine, which causes the turbine to spin and thereby powers the compressor. Aircraft gas turbine engines, referred to herein as jet engines, propel the attached aircraft forward in response to the thrust provided by the flow of the hot exhaust gases from the gas turbine engine. Rotation of the turbine in industrial gas turbine engines generates electrical power.

Air flow surfaces of certain turbine engine components are directly contacted by the hot exhaust gases. The hot exhaust gases heat these components to high temperatures and expose them to impurity elements like sulfur originating from the combusted fuel. Superalloys, in particular, are susceptible to severe oxidation and corrosion in such harsh environments, particularly when the superalloy components of the gas turbine engine are heated by the hot exhaust gas stream created in a jet engine.

Superalloy turbine engine components experience sulfidation when exposed at low temperatures to sulfur originating from the hot exhaust gases and other environmental sources. Generally, sulfidation increases the corrosion rate of superalloys and, in particular, the hot corrosion rate of nickel-based superalloys. Sulfidation is most often observed on portions of superalloy gas turbine components that are heated to temperatures below about 1500° F. (815° C.) during service. Often, superalloy gas turbine components are cooled by a stream of lower temperature air directed through a hollow interior region.

Sulfidation may occur on portions of superalloy gas turbine components that are shielded from direct exposure to the exhaust gas stream, but nevertheless operate at temperatures less than about 1500° F. (815° C.) and are exposed to sulfur from the hot exhaust gases that bypass sealing surfaces. For example, certain gas turbine blades include an airfoil segment that is heated to a temperature greater than 1500° F. (815° C.) when exposed to an exhaust gas stream, a root used to secure the gas turbine blade to a turbine disk of the gas turbine engine, and a platform that separates the airfoil segment from the root. In such gas turbine blades, the root, which is not directly exposed to the exhaust gas stream, is heated by conduction from the airfoil segment and also cooled to less than 1500° F. by heat transfer to the more massive turbine disk. The area of the gas turbine blade beneath the platform is particularly susceptible to sulfidation attack.

Aluminide coatings have been disfavored on certain surfaces of turbine engine components. Most aluminide coatings embrittle the surface of the superalloy material used to manufacture turbine engine components, which may cause a loss of surface ductility because the aluminide coating is not ductile.

Aluminide coatings may unwantedly alter the tight dimensional tolerances required on certain components. For example, areas below the platform, including the root of gas turbine blades, must maintain tight dimensional tolerances to properly couple the airfoil with the turbine disk. As a result, measures are routinely taken to avoid forming aluminide layers on machined pressure faces or root fixing surfaces below the platform when aluminiding the surfaces of the airfoil segment. Nevertheless, areas below the platform remain susceptible to corrosion enhanced by mechanisms like sulfidation.

Platinum aluminides have been proposed as a solution for averting sulfidation attack of regions of the superalloy turbine engine components below the platform. However, platinum aluminide coatings under certain operating conditions may be susceptible to cracking, which provides a path for the migration of sulfur and other corrosive elements to the unprotected superalloy surface. As a consequence of the ensuing sulfidation, the platinum aluminide coating may spall and delaminate, which is not acceptable during operation of the gas turbine engine.

Accordingly, there is a need for a coating effective to protect low-temperature surfaces of turbine engine components from corrosion damage.

SUMMARY OF THE INVENTION

The present invention provides, in one aspect, a non-aluminide protective coating for a turbine engine component, typically having a superalloy substrate, in which a fluid composition layer containing silicon and other elements, such as chromium, is applied to the surface and heated to a temperature sufficient to form the protective coating. The fluid composition layer may be a liquid composition layer or a slurry composition. The protective coating may be effective for reducing the risk of corrosion and sulfidation of the underlying superalloy material.

The turbine engine component may be a turbine blade, such as a jet engine or industrial gas turbine blade, having an airfoil segment and a root fixing integral with the airfoil segment for coupling the airfoil segment with the gas turbine engine. The turbine engine component may be a vane, a shroud, a nozzle guide, or any other part requiring protection from oxidation and corrosion when operating in a gas turbine engine. The turbine engine component may be hollow to permit air cooling or hollow for weight reduction.

Although the invention is not so limited, the turbine engine component may be a nickel-based superalloy and may include chromium in the substrate alloy composition. Protective coatings that are predominately β chromium are believed to not embrittle the superalloy material surface, as do most aluminide coatings. The protective coating is believed to be effective at preventing, or at the least reducing or delaying, corrosion and sulfidation of the underlying superalloy material and, preferably, does not significantly alter the component dimensions. Protective coatings that are predominately β chromium are believed to have a relatively low susceptibility to cracking, in contrast to conventional platinum aluminide coatings.

These and other benefits and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF THE PREFERRED EMBODIMENTS

Figure 1:
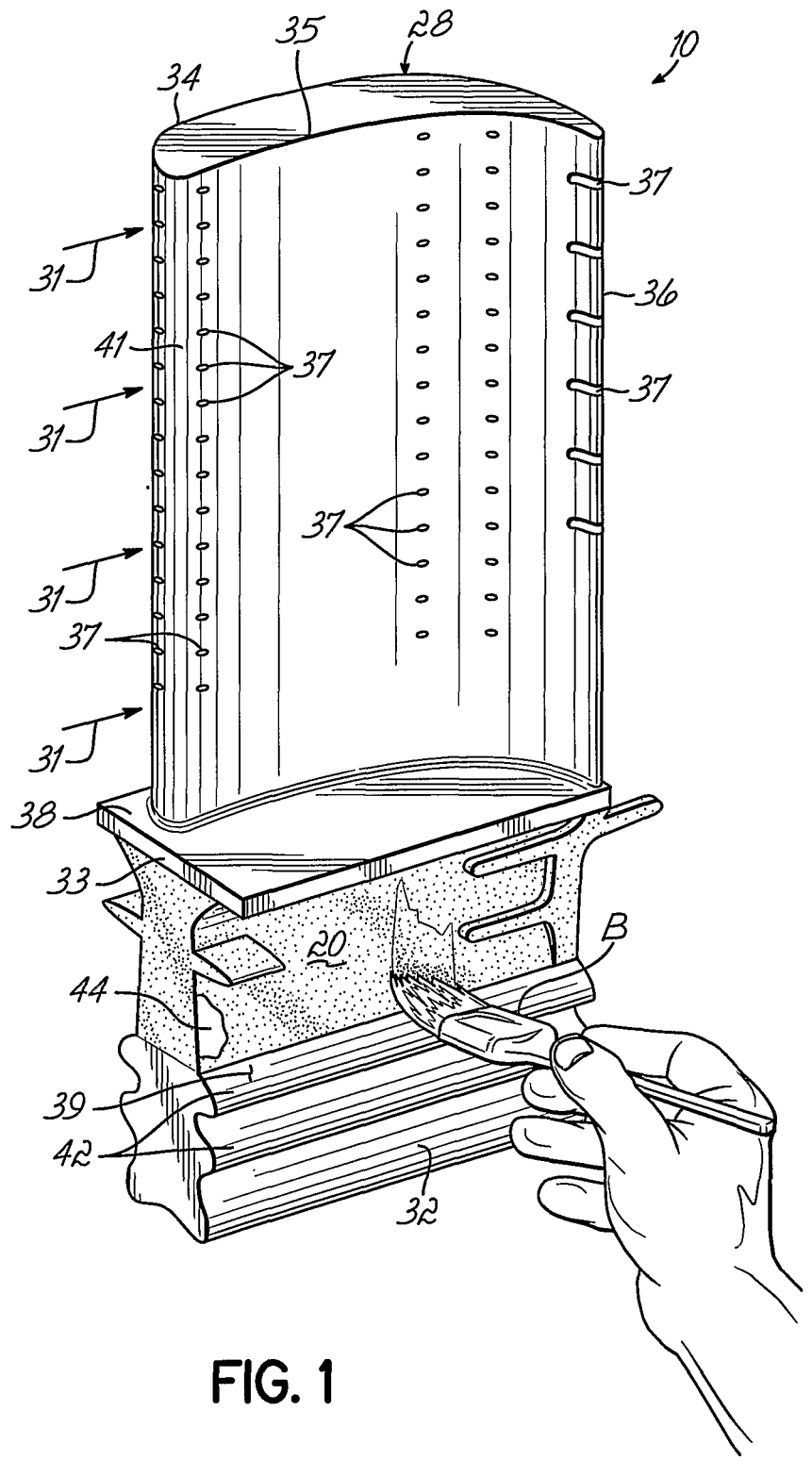
FIG. 1 is a perspective view of a turbine engine component with a fluid composition being applied to a portion of the turbine engine component in accordance with the principles of the present invention.
Figure 2:
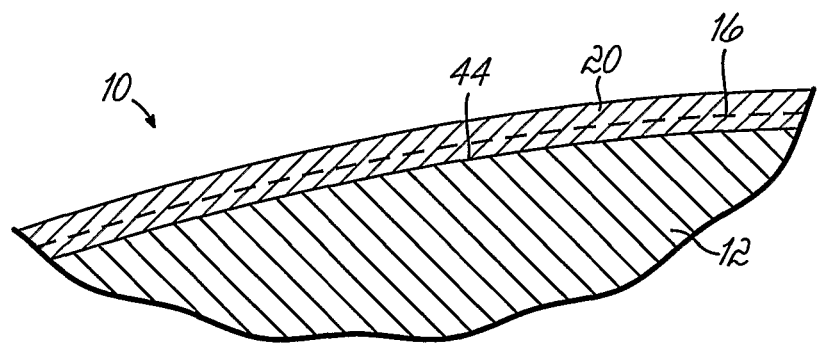
FIG. 2 is a diagrammatic cross-sectional view of a portion of the turbine engine component of FIG. 1 that includes a silicon-containing layer formed by the application of the fluid composition.
Figure 3:
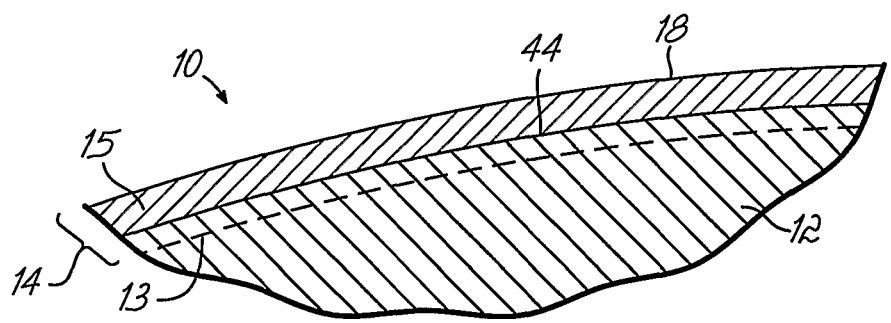
FIG. 3 is a diagrammatic cross-sectional view similar to FIG. 2 after the silicon-containing layer is converted to a protective coating.

With reference to FIGS. 1 and 2 and in accordance with an embodiment of the present invention, a silicon-containing layer 20 is applied to at least portion of an original surface 39 of a turbine engine component 10, such as a gas turbine blade. The silicon-containing layer 20 may be applied as a fluid composition (e.g., liquid composition, solution, or slurry) and then dried to form a pre-coating resident on the turbine engine component 10 before heating to a temperature sufficient to form a non-aluminide protective coating 14 (FIG. 3).

The turbine engine component 10 of the representative construction includes an airfoil segment 28 designed to be in the high-pressure, hot airflow path, as indicated by arrows 31. The airfoil segment 28 of turbine engine component 10 includes a pair of airflow surfaces 34, 35 extending between a trailing edge 36 and a curved leading edge 41 and which constitute portions of the surface 39. Cooling holes 37 intersect airflow surfaces 34, 35 so as to permit cooling air to pass through the interior of airfoil segment 28 while turbine engine component 10 is in service on the gas turbine engine.

Integral with airfoil segment 28 is a dovetail, root, or root fixing 32 used to secure turbine engine component 10 to an air-cooled turbine disk (not shown) of a gas turbine engine (not shown) and a platform 33 separating the airfoil segment 28 from the root 32. Surface 39 extends across the root 32 below the platform 33. The root 32 further includes pressure faces 42 that face toward the airfoil segment 28 and that are used to mechanically engage the turbine engine component 10 with the turbine disk. A region 44 of surface 39 is directly beneath the platform 33 and has an intervening position between the pressure face 42 nearest to the platform 33 and the platform 33. Region 44, which may be referred to as a pocket as understood by a person having ordinary skill in the art, is also present on the opposite side of the root 32 that is not visible in FIG. 1.

Depending upon the use of the turbine engine component 10, combustion gases in the airflow path 31 may have a temperature as high as 3000° F. (1650° C.). Although this promotes heating of the airfoil segment 28, gas cooling of the airfoil segment 28 limits operating temperatures to 1800° F. (980° C.) or less. When the turbine engine component 10 is in service, the temperature of the root 32 is elevated by heat transfer from airfoil segment 28 and other heat sources in the gas turbine engine but is not directly contacted by the combustion gases in airflow path 31. In particular, the root 32 may be cooled by a flow of cooling air supplied to the root 32 at a temperature of about 1100° F. (590° C.). Consequently, the root 32 is significantly cooler than the airfoil segment 28 during operation and, frequently, is at a temperature of less than 1500° F. (815° C.) when the component 10 is in service, which makes the root 32 and, in particular, region 44 of surface 39 susceptible to sulfidation and corrosion.

In accordance with the principles of the present invention, it may be desirable to protect region 44 of the surface 39 of root 32 by forming a protective coating 14 (FIG. 3). Initially, the silicon-containing layer 20 may be applied to surface 39 in region 44, such as by hand application with a paint brush B (FIG. 1) as if being painted, by spraying, or by dipping any excess poured off as the fluid composition is applied. The silicon-containing layer 20 may be optionally applied to other portions of surface 39 outside of region 44.

In one embodiment of the present invention, the silicon-containing layer 20 is applied in a liquid form as a fluid or liquid composition and, thereafter, air dried with optional heating to form a solid or semi-solid coating. Other methods of applying the liquid composition are apparent to a person having ordinary skill in the art, such as dipping the root 32 of turbine engine component 10 into a bath (not shown) of the liquid composition to form silicon-containing layer 20 or spraying the liquid composition in a controlled manner onto only region 44. Thereafter, the turbine engine component 10 coated with the layer 20, which may advantageously first be dried and heated at a temperature insufficient to form a protective layer, may be placed into a heated environment and heated to a temperature at which protective coating 14 will be formed on at least region 44 to an engineered thickness.

A particular fluid or liquid composition that may be selected for use in forming layer 20 is a silicon-containing substance or liquid such as a silane. Silanes suitable for use in the present invention may have mono-, bis-, or tri-functional trialkoxy silane. The silane may be a bifunctional trialkoxy silyl, preferably trimethoxy, or triethoxy silyl groups. Amino silanes may also be used, although thio silanes may not be desired due to their sulfur content. Bisfunctional silane compounds are well known to persons having ordinary skill in the art, and two preferred for use in the present invention are bis(triethoxysilyl)ethane and bis(trimethoxysilyl) methane. In both of these compounds, the bridging group between the two silane moieties is an alkyl group. Additional commercially available silanes include, but are not limited to,
1,2-Bis(tetramethyldisoloxanyl) Ethane
1,9-Bis(triethoxysilyl) Nonane
Bis(triethoxysilyl) Octane
Bis(trimethoxysilyl) Ethane
1,3-Bis(trimethylsiloxy)-1,3-Dimethyl Disiloxane
Bis(trimethylsiloxy) Ethylsilane
Bis(trimethylsiloxy) Methylsilane
Al-501 available from AG Chemetall (Frankfurt Germany)

The silane may be neat, in an aqueous solution, or diluted in an aqueous/alcohol solvent solution. A solvent for the latter type of diluted solution may contain from about 1% to 2% by volume to about 30% by volume deionized water with the remainder being a monohydric alcohol such as methanol, ethanol, n- or iso-propanol, or the like. Ethanol and methanol are preferred monohydric alcohols. The solvent is combined with the silane and glacial acetic acid to preferably establish a pH of about 4-6. The silane concentration in the solution may be limited to a maximum concentration for which the silane remains in solution during application. Generally, the solution will consist of about 1% to about 20% silane, wherein the percentage may be measured either by volume or by weight.

A particularly useful silane for use in providing layer 20 may be an organofunctional silane such as BTSE 1,2 bis (triethoxysilyl)ethane or BTSM 1,2 bis(trimethoxysilyl) methane. The silane may be dissolved in a mixture of water and acetic acid at a pH of five (5), then in denatured alcohol and glacial acetic acid to establish a silane solution. The silane concentration in the solution is between about 1% and 10% by volume and, advantageously, about 5% by volume. This silane solution readily forms the silicon-containing layer 20, which may have a more or less hard consistency, at temperatures readily achieved and at a temperature insufficient to form the protective coating 14.

As explained above, the liquid composition is applied to all or a portion of surface 39 across region 44 to define the silicon-containing layer 20. The liquid composition applied to region 44 is allowed to dry, with optional heating, such as with a heat gun (not shown) or even in a conventional oven (not shown), to about 250° F. (121° C.) for about 15 to 25 minutes, to form the silicon-containing layer 20. Before heating, the liquid composition may first be allowed to air dry, such as underneath a lamp (not shown) or with warm air, to release solvent. Generally, the liquid composition forming the silicon-containing layer 20 is applied in an amount of about 0.01 g/cm$^2$ to about 2.0 g/cm$^2$. Multiple layers of the liquid composition may be applied; each individual layer being dried and heated to remove the solvent before applying the next successive layer. As used herein, the silicon-containing layer 20 may refer to either the initially applied layer of liquid composition, or without limitation to the dried layer. The silicon-containing layer 20 may have a thickness in the range of about 40 nm to about 200 nm, although the invention is not so limited.

Silicon-containing layer 20, which may be applied to all or a portion of region 44, is heated to a temperature and for a duration effective to transform layer 20 into protective coating 14 across the portion of region 44 to which layer 20 is applied. Generally, the conversion temperature is hotter than a curing temperature for layer 20 and cooler than aluminizing temperatures (i.e., about 1850° F. (1010° C.)). For example, a heating temperature greater than about 400° F. (205° C.) may be sufficient to convert the silicon-containing layer 20 to protective coating 14. The temperature to which silicon-containing layer 20 is heated to cause the transformation to protective coating 14 will depend, among other things, upon the composition and characteristics of the liquid composition used to form layer 20 and the composition of the substrate alloy.

The silicon-containing layer 20 may be heated in various different atmospheres and under various different conditions to form the protective coating 14. For example, layer 20 may be heated in an ambient environment suitable to form the non-aluminide protective coating 14 that contains silicon from layer 20 and a concentration of one or more elements from the constituent superalloy material of the turbine engine component 10. For example, the turbine engine component 10 and layer 20 may be heated to a temperature sufficient to cause diffusion of one or more elements from the component 10 into silicon-containing layer 20 for forming a protective layer 14 that contains these elements. As a more specific example, the protective layer 14 may contain chromium and silicon, such as a chromium silicide or a silicon-modified chromium oxide, wherein the chromium originates from the superalloy material of the turbine engine component 10 or a separately deposited beta (β) chromium coating onto the surface of the turbine blade. The ambient environment may be oxygen-depleted, such as a non-oxidizing ambient gas environment created by evacuating a heating chamber and filling the evacuated chamber with an inert gas. Alternatively, the silicon-containing layer 20 may be heated in an oxygen-containing atmosphere to supply oxygen for creating a protective coating 14 containing oxygen, silicon, and optional elements from the material constituting the turbine engine component 10. In this alternative embodiment of the present invention, the protective coating 20 may be a silicate, or may comprise a mixture of metal oxides formed from the superalloy matrix that is covered by a thin silicon-enriched outer layer.

The transformation from the silicon-containing layer 20 to the protective coating 14 may be accomplished by placing the turbine engine component 10 into a heated enclosure, like an oven or furnace. The curing step to form the silicon-containing layer 20, and the subsequent step transforming the cured layer 20 into protective coating 14, may be conducted in the same heated enclosure or by placing the turbine engine component 10 into separate heated enclosures. Generally, the silicon-containing layer 20 will cure at a lower temperature than the temperature required to transform layer 20 into protective coating 14.

Alternatively, the turbine engine component 10 with silicon-containing layer 20 may be placed into a heated deposition environment equipped to form, for example, an aluminide layer (not shown) on the airflow surfaces 34, 35 of airfoil segment 28. In this instance, the portion of the turbine engine component 10 below platform 33 to which the silicon-containing layer 20 is applied is substantially shielded or covered from the heated deposition environment such that aluminide is not formed thereupon. However, the elevated temperature of the turbine engine component 10 during the aluminiding process causes the shielded layer 20 on at least region 44 of surface 39 to transform into protective coating 14. Alternatively, the silicon-containing layer 20 may be applied to at least region 44 and protective coating 14 may be formed on region 44 of surface 39 from layer 20 after an aluminide layer (not shown) is formed in a heated deposition environment on the airflow surfaces 34, 35 of airfoil segment 28.

For turbine engine components 10 having locations within the turbine engine characterized by relatively low operating temperatures, the silicon-containing layer 20 may be advantageously applied to surfaces that are not shielded from the combustion gases in the airflow path 31. For example, the silicon-containing layer 20 may be applied to the airflow surfaces 34, 35 of the airfoil segment 28 and/or a surface 38 of platform 33 facing the airfoil segment 28 and heated to extend the protective coating 14 to cover these surfaces 34, 35, 38, as well as region 44.

Although not wishing to be bound by theory, the protective coating 14 is believed to operate to reduce oxidation and corrosion of the superalloy material, when the component 10 is in service in a gas turbine engine, by passivating or shielding the covered portion of region 44 of surface 39 and, optionally, surfaces 34, 35, 38, and/or the remainder of surface 39.

In an alternative embodiment of the present invention, the silicon-containing layer 20 may further include an additive that is incorporated as an optional dopant into protective coating 14. Suitable additives generally include any compound of the dopant that is dissolvable in the particular silane solution, although additives containing sulfur ligands and/or oxygen ligands may be disfavored. If the dopant is, for example, yttrium, suitable yttrium compounds include, but are not limited to, yttrium halides, such as yttrium chloride, yttrium bromide, yttrium iodide, and yttrium fluoride. Other suitable yttrium compounds include, but are not limited to, yttrium acetate, yttrium acetate hydrate, yttrium 2-ethylhexanoate, yttrium perchlorate solution (e.g., 40 wt. % in water), yttrium nitrate hexahydrate, yttrium nitrate tetrahydrate, yttrium isopropoxide oxide, yttrium isopropoxide solution (e.g., 25 wt. % in toluene), yttrium butoxide solution (e.g., 0.5 M in toluene), yttrium trifluoroacetate hydrate, yttrium oxalate hydrate, and yttrium(III) tris(2,2,6,6-tetramethyl-3,5-heptanedionate). If the dopant is, for example, hafnium, suitable hafnium compounds include, but are not limited to, hafnium halides, such as hafnium chloride, hafnium bromide, hafnium iodide, and hafnium fluoride. Other suitable hafnium compounds include, but are not limited to, any hafnium compound with an organic ligand, such as hafnium tert-butoxide, and hafnium nitrates. Permitted hafnium compounds generally exclude compounds with either sulfur ligands or oxide ligands. These, and other, yttrium and hafnium compounds are commercially available, for example, from Sigma-Aldrich (St. Louis, Mo.).

In this alternative embodiment of the present invention, one or more of the candidate dopant compounds is dissolved in or combined with the silane or silane solution. Before combining, the added amount of the dopant compound is measured for accurately regulating the concentration of dopant in the silicon-containing layer 20 and, subsequently, in the protective coating 14. Typically, a single additive or dopant compound will be combined with the silane to form a fluid composition, which is applied to all or a portion of at least region 44 of the turbine engine component 10.

The present invention is generally applicable to turbine engine components 10 used in jet engine gas turbines and industrial gas turbines. In particular, the present invention is applicable for protecting turbine blades in such turbines. Although the present invention is described with specificity regarding a turbine engine component 10 having a turbine blade construction, it is apparent that the protective coating 14 may be also applied to surfaces of a vane, a shroud, a nozzle guide, or any other part formed of a superalloy or another metal requiring protection from oxidation and corrosion while operating in a jet engine or while operating in an industrial gas turbine engine. The protected surfaces on these components may be exposed to the combustion gases in the airflow path 31 or shielded from the airflow path 31 during service in the aircraft or industrial gas turbine engine.

With reference to FIG. 3, a detailed view of a portion of the turbine engine component 10 and the protective coating 14 is shown. The turbine engine component 10 includes a metallic substrate 12 and the protective coating 14 on the region 44 of the substrate 12. The metallic substrate 12 may be made of any nickel-, cobalt-, or iron-based high temperature superalloy from which such turbine engine components 10 are commonly made. The base element, typically nickel or cobalt, is proportionally by weight the largest elemental constituent in the superalloy of substrate 12. For example, where the component 10 is used in a jet engine, substrate 12 may be the nickel-based superalloy Inconel 795 Mod5A or CMSX-4. The present invention is, however, not intended to be limited to any particular turbine engine component 10, which may be a turbine blade, a vane, a shroud, a nozzle guide, or any other part requiring protection from oxidation and corrosion while operating in a jet engine or while operating in an industrial gas turbine engine. The protective coating 14, which protects the underlying metal of the component 10 against oxidation and corrosion, is typically applied to portions of the turbine engine component 10 that are not heated above about 1500° F. (815° C.) when the component 10 is in service.

The protective coating 14 may be an additive layer 15 or, more typically, may include a concentration of one or more elements from substrate 12 because of interdiffusion between the applied silicon-containing layer 20 and the superalloy material of the substrate 12. In such diffusion coatings, the protective coating 14 will be generally characterized by a diffusion zone 13 in addition to the additive layer 15 that overlies the diffusion zone 13. The interdiffusion advantageously introduces a concentration of one or more additional elements, such as chromium, from the substrate 12 into the protective coating 14 that ultimately endow the coating 14 with beneficial protective capabilities.

The protective coating 14 may be an alloy containing silicon and chromium, such as chromium silicide, that is effective to prevent or significantly reduce sulfidation, oxidation, and corrosion on the protected region 44 (FIG. 1). The chromium may originate from the superalloy material of the substrate 12 or from a pre-existing chromide or β chromium coating 16 on the region 44 that melts during heating to supply a source of chromium for the protective coating 14. Alternatively, if formed in an oxidizing atmosphere, the protective coating 14 may be a compound containing silicon and oxygen. The compound containing the silicon and oxygen may be a glass precursor of silicon, such as $SiO_2$, a silicate, or a silicon-modified chrome oxide.

The protective coating 14 may further include a dopant, such as yttrium and/or hafnium that, if present, is believed to operate as a getter or trap for the impurity or tramp element sulfur in the protective coating 14. Although not wishing to be bound by theory, the presence of the dopant is believed to reduce the transport of sulfur across the thickness of the protective coating 14 to the substrate 12 and thereby shield the superalloy material of the substrate 12 from sulfur. The protective coating 14 may, either alternatively or in addition to yttrium and/or hafnium, include other beneficial dopants that are believed to inhibit or prevent corrosion and, in particular, other beneficial dopants capable of inhibiting or preventing corrosion enhancement by the sulfidation mechanism.

The protective coating 14 has a thickness extending from the surface of the turbine engine component 10 to an exposed working surface 18. The optional dopant may be present with a uniform concentration through the protective coating 14 or may be present with a concentration gradient between the working surface 18 and surface 39 in the region 44. The peak concentration of the gradient of the dopant may be at, or near, the working surface 18. If the protective coating 14 is eroded, the dopant is preferably distributed in protective coating 14 so that the protective coating 14 will continuously have a dopant concentration effective for gettering or trapping sulfur.

The silicon-containing layer 20 may be applied, and the resulting protective coating 14 formed, directly as an additive layer on an existing coating, such as a platinum aluminide or a β chromium coating 16, on at least region 44 of surface 39 (FIG. 1). Alternatively, any existing coating may be stripped from region 44 and, optionally, from airflow surfaces 34, 35 of the airfoil segment 28 before the silicon-containing layer 20 is applied for forming the protective coating 14. The protective coating 14 may be formed on region 44 before the turbine engine component 10 has been placed into service and either before machining or after machining with airflow surfaces 34, 35 masked. It may be desirable to mask the portion of surface 39 extending across the pressure faces 42 so that protective coating 14 is formed only across region 44 below platform 33 or any thickness of coating 14 formed on the pressure faces 42 is negligible.

Although the present invention is described with specificity regarding a turbine engine component 10 having a turbine blade construction, it is apparent that the protective coating 14 may be also applied to surfaces of a vane, a shroud, a nozzle guide, or any other part requiring protection from oxidation and corrosion while operating in a gas turbine engine. These surfaces may be exposed to the combustion gases in the airflow path 31 or shielded from the airflow path 31 during use.

In an alternative embodiment of the present invention, the silicon-containing layer 20 may comprise a fluid or slurry composition that contains amounts of a silicon-containing material or substance, a chromium-containing material or substance, an inert diluent, a halide activator, and an optional inorganic binder. The chromium-containing substance, inert diluent, and activator of the slurry composition are preferably in a particulate or powder form. The silicon-containing substance may be a silane, the chromium-containing substance may be chromium powder, the inert diluent may be alumina ($Al_2O_3$) particles, and the halide activator may be ammonium bifluoride ($NH_4HF_2$). The inert diluent prevents sintering of the chromium-containing substance in the silicon-containing layer 20 when the layer 20 is heated to form protective coating 14. The turbine engine component 10 and silicon-containing layer 20 are heated in a non-oxidizing atmosphere or vacuum to a temperature that is maintained for a duration sufficient to form protective coating 14. The heating conditions may be, for example, a temperature of about 1975° F. (1080° C.) for four hours in an inert (e.g., argon) atmosphere. The slurry composition may be applied to at least region 44 of surface 39 to form silicon-containing layer 20 by methods such as brushing, spraying, and dipping. In alternative embodiments of the invention, silane in the slurry composition may be replaced by a different silicon-containing substance, such as colloidal silicon or elemental silicon powder. Optionally, the slurry composition may contain a dopant compound, such as yttrium acetate or hafnium chloride, as described herein.

The amount of slurry composition applied is controlled because the thickness of the resulting protective coating 14 is proportional to the amount of slurry composition applied in layer 20 to at least region 44 of surface 39. Preferably, the slurry composition is applied as layer 20 to region 44 with a substantially uniform thickness. The slurry composition may comprise, by weight percent, about 1% to about 20% of the powdered chromium-containing substance, greater than 2% of the activator powder, about 60% to about 90% of the inert filler powder, and balance binder and neat silane. The specific slurry composition may be tailored to provide a desired composition for the protective coating 14, as well as other processing variables such as time and temperature, and the coating thickness and composition desired for protective coating 14. Because the chromium in protective coating 14 does not originate from the substrate 12 of the component 10, the superalloy material of substrate 12 does not have to operate as a chromium source and the chromium-containing protective coating 14 may be formed regardless of the chromium content of the substrate 12. However, minor amounts of substrate elements may diffuse into the protective coating 14.

The binder may comprise any suitable conventional binder known to a person having ordinary skill in the art. Suitable binders include NICOBRAZ® cements commercially available from Wall Colmonoy Corporation (Madison Heights, Mich.). Alternatively, the binder may be omitted from the slurry composition forming layer 20 if another substance in the layer 20, such as the silane, can operate as a binder for adhering the slurry composition to the surface 39 of component 10.

In use, the slurry composition is directly applied to all or a portion of region 44 of surface 39 of the root 32 of turbine engine component 10 to form silicon-containing layer 20. The silicon-containing layer 20 is heated in an inert or evacuated atmosphere (i.e., non-oxidizing) to a temperature sufficient to vaporize the activator in the layer 20. The vaporized activator reacts with the chromium-containing substance in the layer 20 to promote chemical reactions that liberate chromium from the substance to participate in forming protective coating 14. The heating conditions may be, for example, a temperature in the range of 1875° F. (1025° C.) to 1900° F. (1040° C.) for four hours in an inert atmosphere. After processing, unreacted slurry residues may be removed by, for example, brushing or blasting with glass beads such as BALLOTINI® impact glass beads commercially available from Potters Brothers, Inc. (Carlstadt, N.J.).

The invention further contemplates that the fluid compositions described herein may be introduced into cooling holes 37 or other internal passages of the turbine engine component 10 for purposes of forming a protective coating 14 on the internal surfaces bordering the cooling holes 37. To that end, the silicon-containing fluid composition is introduced into the cooling holes 37 to form silicon-containing layer 20 and heated to form the protective coating 14 on these internal surfaces.

In another alternative embodiment of the invention, the silicon-containing layer 20 may be applied in stages to form the protective coating 14. For example, the silane may be omitted from the slurry composition initially applied as a first portion of layer 20 to all or a portion of region 44 of surface 39. Heating layer 20 results in the formation of a chromium-rich layer (e.g. β chromium layer) on region 44 to which the first portion of layer 20 is applied. After the chromium-rich layer is formed, the turbine engine component 10 is grit blasted using, for example, impact glass beads or aluminum oxide 220 grit. Silane is then applied, as described above, on region 44 with the chromium-rich layer as a second portion of the layer 20. Protective coating 14 is formed by heating, for example, at 250° C. for 30 minutes to react the silane with the chromium-rich layer to form the protective coating 14. Silicon from the silicon-containing layer 20 diffuses into the β chromium layer. Chromium from the β chromium coating also diffuses into the non-aluminide protective coating 14.

The invention further contemplates that any of the different liquid or slurry compositions forming silicon-containing layers 20 may be used in combination with chromium that originates from the superalloy material of the substrate 12 or from a pre-existing β chromium coating 16 on the region 44.

While the present invention has been illustrated by the description of an embodiment thereof and specific examples, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicants' general inventive concept.

Having described the invention, what is claimed is:

1. A coating process for protecting a metal component (10), comprising:
    applying a layer (20) of a silicon-containing fluid composition comprising a silane liquid to at least a portion of the metal component (10), wherein the silane liquid defines an amino silane or includes a mono, bis, or tri-functional trialkoxy silane;
    applying a chromium-containing substance to the metal component (10) as a constituent of the silicon-containing fluid composition in layer (20);
    curing the silicon-containing fluid composition after the layer (20) is applied to the metal component (10);
    and heating the cured silicon-containing fluid composition to a temperature effective to form a non-aluminide protective coating (14) on the metal component (10), the protective coating (14) including a diffusion zone that includes silicon diffused from the cured silicon-containing fluid composition and chromium;
    wherein applying the chromium-containing substance further comprises:
    applying a halide activator and an inert diluent powder to the metal component (10) as constituents of the silicon-containing fluid composition in layer (20), the inert diluent powder preventing sintering of the chromium-containing substance in the layer (20) during the heating of the cured silicon-containing fluid composition.

2. A coating process for protecting a turbine engine component (10) having a first section (28) with an airflow surface (34) and a second section (32) used to secure the first section (28) to the gas turbine engine, the coating process comprising:
    applying a layer (20) of a silicon-containing fluid composition comprising a silane liquid into direct contact with at least a portion of the second section (32) of the turbine engine component (10), wherein the silane liquid defines an amino silane or includes a mono, bis, or tri-functional trialkoxy silane;
    curing the silicon-containing fluid composition after the layer (20) is applied to the second section (32) of the turbine engine component (10);
    heating the cured silicon-containing fluid composition to a temperature effective to form a non-aluminide protective coating (14) on the second section (32) of the turbine engine component (10), the protective coating (14) including a diffusion zone that includes silicon diffused from the cured silicon-containing fluid composition and that further includes chromium diffused from the material of the turbine engine component (10); and
    placing the silicon-containing fluid composition in an oxidizing atmosphere before heating the cured silicon-containing fluid composition, whereby, following heating in the oxidizing atmosphere, the protective coating (14) includes a compound containing silicon and oxygen.

3. A coating process for protecting a turbine engine component (10) having a first section (28) with an airflow surface (34) and a second section (32) used to secure the first section (28) to the gas turbine engine, the coating process comprising:
    applying a layer (20) of a silicon-containing fluid composition comprising a silane liquid into direct contact with at least a portion of the second section (32) of the turbine engine component (10), wherein the silane liquid defines an amino silane or includes a mono, bis, or tri-functional trialkoxy silane;
    curing the silicon-containing fluid composition after the layer (20) is applied to the second section (32) of the turbine engine component (10); and
    heating the cured silicon-containing fluid composition to a temperature effective to form a non-aluminide protective coating (14) on the second section (32) of the turbine engine component (10), the protective coating (14) including a diffusion zone that includes silicon diffused from the cured silicon-containing fluid composition and that further includes chromium diffused from the material of the turbine engine component (10); and further comprising:
    adding a dopant selected from the group consisting of yttrium, hafnium, and combinations thereof to the silane liquid, the dopant being dissolved in the silane liquid.

* * * * *